United States Patent [19]

Tachibana

[11] Patent Number: 5,315,387
[45] Date of Patent: May 24, 1994

[54] HORIZONTAL SYNCHRONIZATION CIRCUIT

[75] Inventor: Miyuki Tachibana, Nagasaki, Japan

[73] Assignee: Mitsubishi Denki Kabushiki Kaisha, Tokyo, Japan

[21] Appl. No.: 6,493

[22] Filed: Jan. 21, 1993

[30] Foreign Application Priority Data

Jan. 27, 1992 [JP] Japan .................. 4-034036

[51] Int. Cl.⁵ .................. H04N 5/06; H04N 5/12
[52] U.S. Cl. .................. 348/521; 348/522; 348/536
[58] Field of Search .............. 358/148, 150, 153, 155, 358/157, 159, 149, 319; H04N 5/06, 5/07, 5/04, 5/12

[56] References Cited

U.S. PATENT DOCUMENTS

| | | | |
|---|---|---|---|
| 4,467,359 | 8/1984 | Hosoya | 358/159 |
| 4,476,490 | 10/1984 | Kaneko . | |
| 4,520,394 | 5/1985 | Kaneko | 358/150 |
| 4,636,861 | 1/1987 | Willis . | |
| 4,729,024 | 3/1988 | Kawai et al. . | |
| 4,769,704 | 9/1988 | Hirai et al. | 358/150 |
| 4,802,009 | 1/1989 | Hartmeier | 358/159 |
| 4,870,490 | 9/1989 | Sekiya et al. . | |
| 4,952,850 | 8/1990 | Ogino et al. . | |
| 4,996,596 | 2/1991 | Hirao et al. | 358/148 |
| 5,043,813 | 8/1991 | Christopher . | |
| 5,181,116 | 1/1993 | Nakagaki et al. . | |

FOREIGN PATENT DOCUMENTS

| | | |
|---|---|---|
| 0297847 | 1/1989 | European Pat. Off. . |
| 3603621 | 8/1987 | Fed. Rep. of Germany . |
| 3719876 | 12/1987 | Fed. Rep. of Germany . |
| 3931946 | 4/1990 | Fed. Rep. of Germany . |
| 4022675 | 4/1991 | Fed. Rep. of Germany . |
| 0173267 | 10/1982 | Japan ................ 358/148 |
| 58-201469 | 11/1983 | Japan . |
| 62-81177 | 4/1987 | Japan . |
| 63-155825 | 6/1988 | Japan . |
| 2-237281 | 9/1990 | Japan . |
| 0049478 | 3/1991 | Japan ............... H04N 5/6 |
| 0220872 | 9/1991 | Japan ............... H04N 5/6 |
| 4044469 | 2/1992 | Japan ............... H04N 5/6 |

OTHER PUBLICATIONS

"Video Overlay Synchronizer/Sync Generator", *IBM Technical Disclosure Bulletin*, vol. 29, No. 1, Jun. 1986, pp. 332-333.

*Primary Examiner*—James J. Groody
*Assistant Examiner*—Michael H. Lee
*Attorney, Agent, or Firm*—Burns, Doane, Swecker & Mathis

[57] ABSTRACT

A horizontal synchronization circuit uses a standard decoder to generate a stable first signal locked in frequency and phase to horizontal synchronizing pulses in a composite video signal. A waveshaping circuit reshapes the first signal to generate a second signal for input to a synchronizing circuit. The synchronizing circuit generates a higher-frequency third signal. A timing generator divides the frequency of the third signal to generate a fourth signal having the same frequency as the first and second signals, and a fifth signal having a higher frequency. The fourth signal is fed back to the synchronizing circuit, and can also be used for synchronization of video signal processing. The fifth signal can be used for horizontal scanning at a rate higher than the standard horizontal frequency.

12 Claims, 1 Drawing Sheet

HORIZONTAL SYNCHRONIZATION CIRCUIT

BACKGROUND OF THE INVENTION

This invention relates to a horizontal synchronization circuit for use in a television receiver or the like.

One of the components of a television receiver is a decoder that receives a composite video signal, separates the horizontal and vertical synchronizing signals from the image signals, and provides output signals for image formation and scanning control. For horizontal scanning control, the decoder is adapted to output a signal that remains stable at a horizontal scanning frequency $f_H$ even if the composite video signal is temporarily disturbed by channel switching or noise. Decoders of this type are readily available from various manufacturers.

Some types of displays, however, must be scanned at a rate higher than the conventional $f_H$. This is true in particular of displays that employ more than the standard number of scanning lines to achieve improved image definition, and of displays in which the picture signal is converted from interlaced to sequential scanning. Examples of such displays are to be found not only in television receivers but also in so-called multimedia displays that display both images produced from video signals and images produced from a computer, and in displays with very large screens such as the outdoor displays employed in stadiums and other public places.

In many cases the higher scanning frequencies needed by these displays are not available from existing decoders, hence must be generated by an external circuit. The external circuit may also generate other necessary timing signals. To keep these signals synchronized with the composite video signal the external circuit conventionally receives the composite video signal, extracts the horizontal synchronizing pulses, and feeds them as input to a phase-locked loop.

A problem is that the phase-locked loop does not produce stable output signals when horizontal synchronizing pulses in the composite video signal are missing or otherwise disturbed. This leads to disruption of the display when the composite video signal is contaminated by noise, or when the signal is switched from one video source to another. This problem could be solved by providing the external circuit with features similar to those found in the decoder, but that would require much complex and expensive circuitry.

SUMMARY OF THE INVENTION

It is accordingly an object of the present invention to provide a stable synchronizing signal having a frequency higher than the frequency of horizontal synchronizing pulses in a composite video signal.

Another object of the invention is to generate stable output signals at a plurality of frequencies.

The invented horizontal synchronization circuit comprises a decoder for receiving a composite video signal, separating horizontal synchronizing pulses having a certain horizontal frequency, and generating a first signal having the same horizontal frequency. The first signal is locked in phase with the horizontal synchronizing pulses, and is held steady in frequency and phase even in the absence of the horizontal synchronizing pulses.

A waveshaping circuit reshapes the first signal to generate a second signal for input to a synchronizing circuit. The synchronizing circuit generates a third signal having a frequency higher than the horizontal frequency. The frequency of the third signal is controlled according to the phase difference between the second signal and a fourth signal, which the synchronizing circuit receives from a timing generator.

The fourth signal, which has the horizontal frequency, is produced by dividing the frequency of the third signal. The fourth signal can be applied to a video signal-processing circuit to synchronize the processing of color signals output by the decoder. The timing generator also divides the frequency of the third signal to generate a fifth signal, which has a frequency higher than the horizontal frequency. The fifth signal can be supplied to a display device as a horizontal scanning signal.

DETAILED DESCRIPTION OF THE INVENTION

Figure 1:
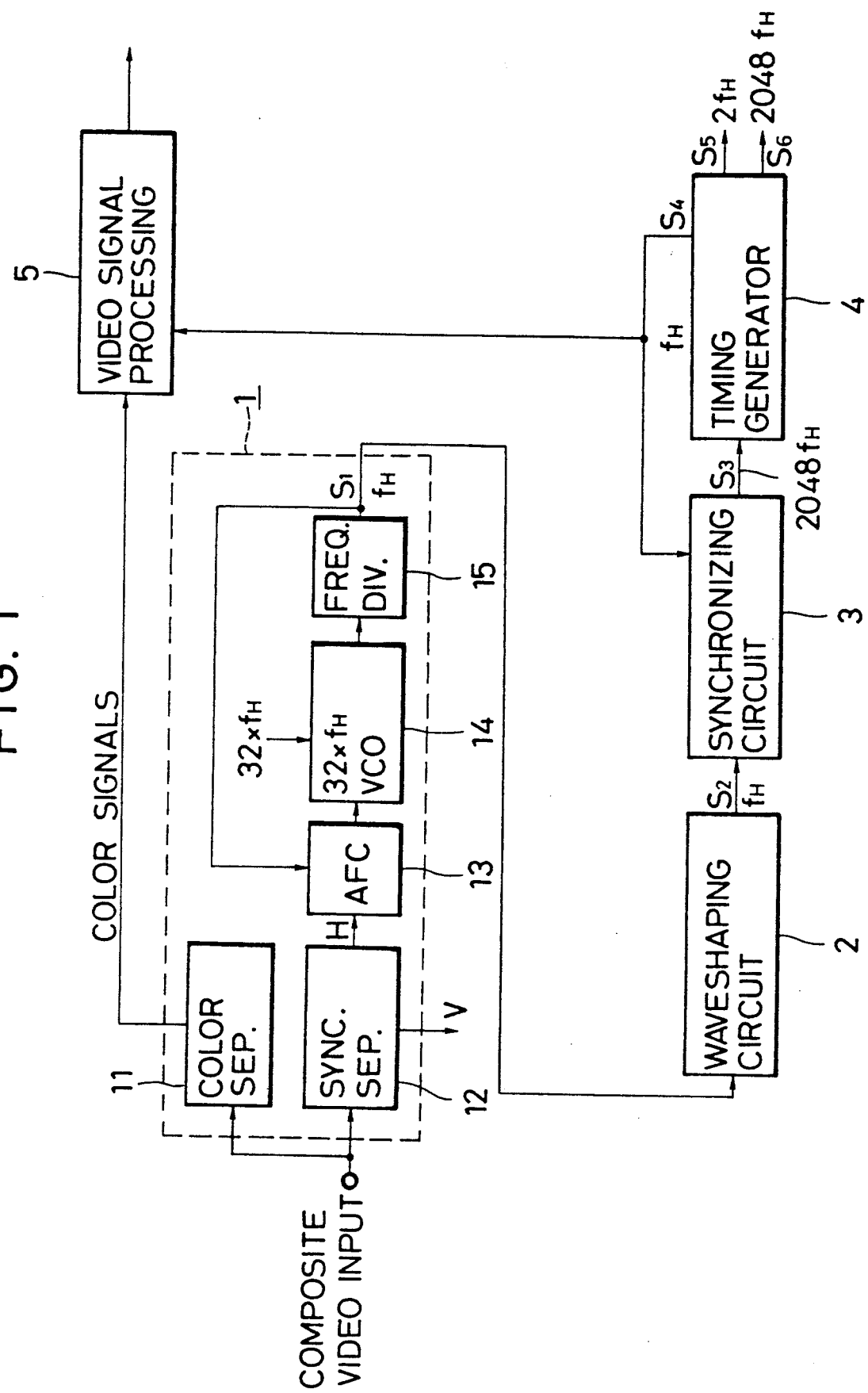
FIG. 1 is a block diagram of the invented horizontal synchronization circuit.

The invention will now be described in more detail with reference to the drawing. The drawing is provided as an illustration of the invention but should not be construed as limiting the scope of the invention. Signal frequency values mentioned in the description will apply to an input video signal of the type recommended by the National Television System Committee (NTSC), having a horizontal frequency $f_H$ of 15.75 kHz, but this is not a restriction either. The invention can obviously be practiced with other types of video signals such as PAL or SECAM video signals.

Referring to FIG. 1, the invented horizontal synchronization circuit uses a decoder 1 to receive and decode a composite video input signal, thereby creating various output signals. These include color signals, a vertical synchronizing signal V, and a signal $S_1$ that is locked in frequency and phase to horizontal synchronizing pulses in the input video signal.

The signal $S_1$ output from the decoder 1 is received by a waveshaping circuit 2, which generates an output signal $S_2$. The signal $S_2$ output from the waveshaping circuit 2 is received by a synchronizing circuit 3, which generates an output signal $S_3$. The signal $S_3$ output from the synchronizing circuit 3 is received by a timing generator 4, which generates output signals $S_4$, $S_5$, and $S_6$. The signal $S_4$ output from the timing generator 4 and the color signals output from the decoder 1 are received by a video signal-processing circuit 5. The signal $S_4$ is also returned to the synchronizing circuit 3. The frequencies of the signals $S_1$, $S_2$, $S_3$, $S_4$, $S_5$, and $S_6$ are $f_H$ or multiples of thereof, as indicated in the drawing.

The decoder 1 is a large-scale integrated circuit comprising a color separation circuit 11, a synchronizing signal separation circuit 12, an automatic frequency control circuit 13, a voltage-controlled oscillator 14, and a frequency divider 15. The color separation circuit 11 separates the color signals from the video input signal. The synchronizing signal separation circuit 12 separates a horizontal synchronizing signal H and the vertical synchronizing signal V from the video input signal. The vertical synchronizing signal V is output from the decoder 1 to external circuits not shown in the drawing.

The horizontal synchronizing signal H is received by the automatic frequency control circuit 13, which generates a voltage signal that controls the voltage-controlled oscillator 14. The voltage-controlled oscillator 14 receives a signal having a frequency of, for example, substantially $32 \times f_H$ from an external oscillator circuit (not shown in the drawing) and adjusts this frequency in response to the voltage signal from the automatic frequency control circuit 13. The output of the voltage-controlled oscillator 14 is divided by the frequency divider 15 to produce the signal $S_1$, which is provided to the waveshaping circuit 2 and also fed back to the automatic frequency control circuit 13. Further details of the automatic frequency control circuit 13 will be given later.

The waveshaping circuit 2 comprises, for example, a delay line and standard logic gates. The synchronizing circuit 3 comprises, for example, standard integrated circuits (ICs) and discrete components, such as a phase detector IC and a voltage-controlled oscillator IC with a connected inductor-capacitor (LC) network adapted to produce an oscillation frequency of about 32 MHz, which is $2048 \times f_H$. The timing generator 4 comprises, for example, standard integrated circuits such as counters, latches, and gates.

Next the operation of the invented horizontal synchronization circuit will be described.

The horizontal synchronizing signal H output from the synchronizing signal separation circuit 12 comprises a series of narrow pulses. These pulses generally come at a rate of 15.75 kHz ($f_H$), but the pulse train may sometimes be disrupted by switching of the composite video signal source, or by channel switching or noise.

The automatic frequency control circuit 13 has a phase detector that compares the phase of these pulses with the phase of the $S_1$ signal fed back from the frequency divider 15. The voltage signal output by the automatic frequency control circuit 13 is proportional to the phase difference. The effect is to lock the output $S_1$ of the frequency divider 15 in phase and frequency with the horizontal synchronizing pulses. The automatic frequency control circuit 13 also comprises circuits such as filters, detectors, and switches that are adapted to prevent missing pulses or noise in the horizontal synchronizing signal H from affecting the voltage signal output. These circuits assure that the voltage-controlled oscillator 14 will continue to oscillate at the same frequency, and the frequency divider 15 will continue to provide a regular output signal $S_1$ of frequency $f_H$ when the input composite video signal is disrupted, or even cut off entirely.

The output signal $S_1$ is a square wave with a duty cycle of substantially fifty percent. The phase detector in the synchronizing circuit 3 requires input of pulses with a more narrow pulse width. The waveshaping circuit 2 reduces the duty cycle of the signal $S_1$ so that the signal $S_2$ has the pulse width required by the synchronizing circuit 3.

The synchronizing circuit 3 compares the phase of the signals $S_2$ and $S_4$ and adjusts the frequency of the signal $S_3$ so as to reduce the phase difference between $S_2$ and $S_4$ to zero. The signal $S_4$ is thereby locked in frequency and phase with the signal $S_2$, which is locked to the signal $S_1$, which is in turn locked to the horizontal synchronizing signal H.

The timing generator 4 divides the frequency of $S_3$ ($2048 \times f_H$) by various amounts to produce the output signals $S_4$, $S_5$, and $S_6$. More specifically, it divides $S_3$ by a factor of 1024 to produce $S_5$ and by a factor of 2048 to produce $S_4$, while $S_6$ is produced by passing $S_3$ straight through the timing generator 4 without frequency division. Since the signal $S_1$ output by the decoder 1 remains regular even when the composite video signal is disturbed or cut off, so do the other signals $S_2$, $S_3$, $S_4$, $S_5$, and $S_6$.

The signal $S_4$ is provided as a timing signal to the video signal-processing circuit 5, enabling it to operate in synchronization with the video input signal, which has a horizontal frequency of $f_H$. The signal $S_5$ is provided to external circuits (not shown in the drawing) that control the scanning of a display device. The signal $S_6$ is supplied as a clock signal to an analog-to-digital converter and digital signal-processing circuits that receive and digitize the output of the video signal-processing circuit 5 and carry out digital operations to improve image quality. The output signals $S_5$ and $S_6$ enable image quality to be improved by, for example, doubling the number of scanning lines, or performing sequential scanning instead of interlaced scanning.

One advantage of the invented horizontal synchronization circuit is that it provides stable output signals having a variety of frequencies. Another advantage is that these output signals are all synchronized with the input composite video signal. Yet another advantage is that the output signals remain stable even when the composite video signal is disturbed or missing. Still another advantage is that, by using the output of the decoder 1, the invented horizontal synchronization circuit generates these stable output signals without having to duplicate the complex circuitry found in the automatic frequency control circuit 13.

If output frequencies other than $2 \times f_H$ and $2048 \times f_H$ are required, the timing generator can be modified to produce them. If necessary, the frequency of the signal $S_3$ output by the synchronizing circuit 3 can be modified, by changing the frequency of the oscillator in the synchronizing circuit 3 for example. The frequency supplied to the voltage-controlled oscillator 14 in the decoder 1 can also be changed as required by the particular decoder 1. These and other modifications, which will be obvious to those skilled in the art, can be made without departing from the spirit and scope of the invention, which should be determined solely from the following claims.

What is claimed is:

1. A horizontal synchronization circuit, comprising:
   a decoder having an automatic frequency control circuit for receiving a composite video signal, separating therefrom horizontal synchronizing pulses having a certain horizontal frequency, generating a first signal also having said horizontal frequency, and locking said first signal in phase with said horizontal synchronizing pulses;
   a waveshaping circuit coupled to said decoder, for reshaping said first signal by reducing the duty cycle of said first signal to generate a second signal also having said horizontal frequency;
   a synchronizing circuit coupled to said waveshaping circuit, for receiving said second signal, generating a third signal with a frequency higher than said horizontal frequency, receiving a fourth signal, and controlling the frequency of said third signal according to a phase difference between said fourth signal and said second signal; and
   a timing generator coupled to said synchronizing circuit, for receiving said third signal and dividing the frequency thereof, thereby generating said fourth signal and a fifth signal, said fourth signal having said horizontal frequency and said fifth signal having a higher frequency.

2. The circuit of claim 1, wherein said first signal has a first pulse width, said second signal has a second pulse width, and said second pulse width is less than said first pulse width.

3. The circuit of claim 1, wherein the frequency of said third signal is two thousand forty-eight times said horizontal frequency.

4. The circuit of claim 1, wherein the frequency of said fifth signal is twice said horizontal frequency.

5. The circuit of claim 1, wherein said fifth signal is used as a horizontal scanning signal.

6. The circuit of claim 1, wherein said fourth signal is also supplied to an external video signal-processing circuit.

7. The circuit of claim 6, wherein said decoder also separates color signals from said composite video signal, and provides said color signals to said external video signal-processing circuit to be processed in synchronization with said fourth signal.

8. The circuit of claim 1, wherein said timing generator also generates a sixth signal having a frequency higher than the frequency of said fifth signal.

9. The circuit of claim 8, wherein said sixth signal is supplied to external circuits as a clock signal.

10. The circuit of claim 8, wherein wherein the frequency of said sixth signal equals the frequency of said third signal.

11. The circuit of claim 1, wherein said decoder comprises:
- a voltage-controlled oscillator controlled by said automatic frequency control circuit; and
- a frequency divider that produces said first signal from output of said voltage-controlled oscillator.

12. The circuit of claim 1, wherein said decoder holds said first signal steady in frequency during times when said horizontal synchronizing pulses are missing.

* * * * *